Aug. 23, 1932.  H. R. HUNKINS  1,872,954
VARIABLE ATTENUATOR
Filed Oct. 29, 1930   2 Sheets-Sheet 1

INVENTOR
HAROLD R. HUNKINS
BY
William F. Nickel
ATTORNEY

Aug. 23, 1932.  H. R. HUNKINS  1,872,954
VARIABLE ATTENUATOR
Filed Oct. 29, 1930  2 Sheets-Sheet 2

INVENTOR
HAROLD R. HUNKINS
BY
ATTORNEY

Patented Aug. 23, 1932

1,872,954

UNITED STATES PATENT OFFICE

HAROLD R. HUNKINS, OF BROOKLYN, NEW YORK, ASSIGNOR TO INTERNATIONAL COMMUNICATIONS LABORATORIES, INCORPORATED, OF NEW YORK, N. Y., A CORPORATION OF NEW YORK

VARIABLE ATTENUATOR

Application filed October 29, 1930. Serial No. 491,908.

This invention relates to transmission systems and particularly to devices for adjusting the attenuation losses in said system.

An object of the invention is to provide an attenuation control device which will insert attenuation in smooth and gradual steps between two transmission lines connected thereto.

Another object of the invention is that said attenuation device shall insert equal increments of attenuation for equal increments of angular rotation of its operating dials.

Another object of the invention is that said attenuation device shall present a constant impedance in one or both directions toward the transmission lines to which the same is connected, as desired.

Another object of my invention is the provision of an attenuation control device wherein there is a plurality of continuously variable resistance elements arranged to be adjusted so that the electrical network incorporating said elements will insert transmission loss between circuits connected thereto, said loss being continuously variable between definite limits.

Other objects and advantages of my invention, together with certain details of construction and combinations of parts, will be fully set forth in the specification and pointed out in the appended claims.

Figure 5:
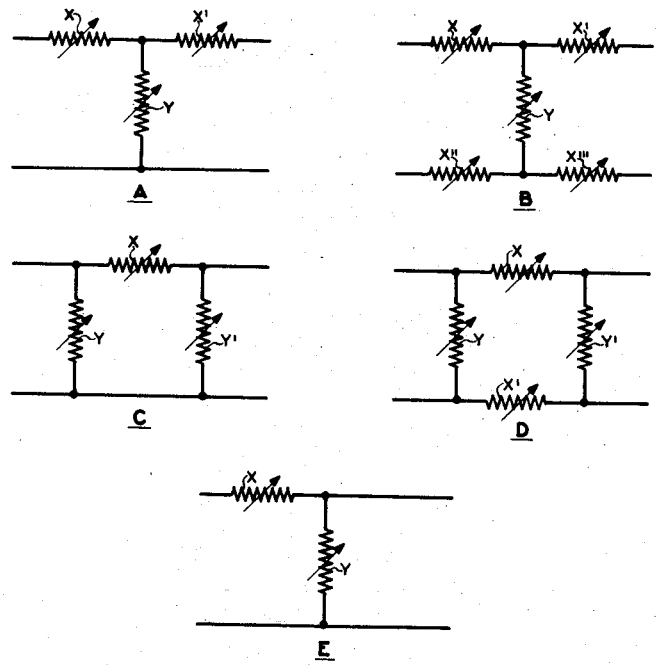

Fig. 5, A, B, C, D, E are schematic diagrams showing five possible configurations of resistance elements into attenuation networks, which may be physically realized through proper combinations of individual resistance elements of the types shown in Figs. 1 to 4 inclusive.

Figure 1:
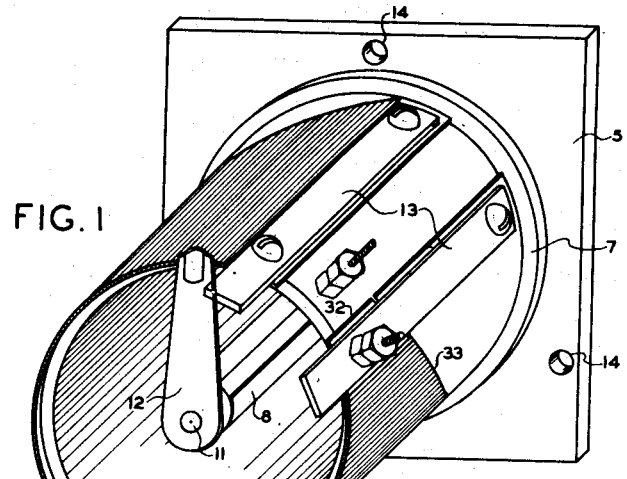
Fig. 1 is a perspective view of one section of a device according to my invention, showing a single resistance coil.
Figure 2:
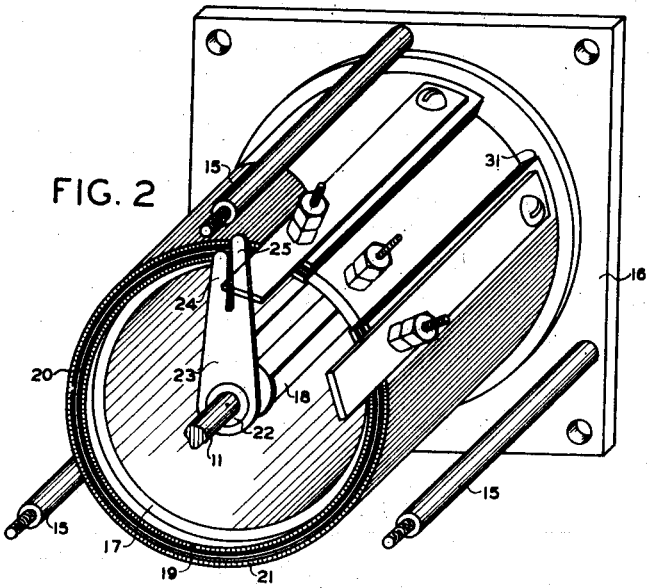
Fig. 2 is a perspective view of another section of said device showing two resistance coils concentrically arranged.
Figure 6:
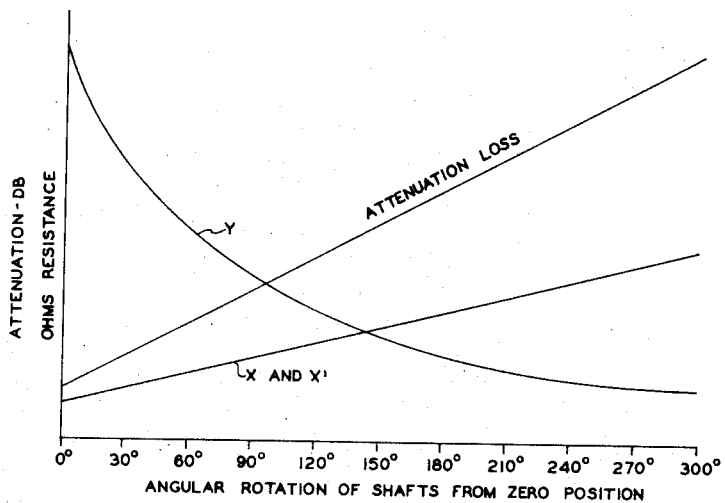

Fig. 6 is a set of curves indicating the manner in which the values of resistance as shown in Fig. 5A for example, vary for various degrees of angular rotation of the shafts from zero position. Corresponding variations of the resistance of the coils shown in Figs. 1 and 2 are realized by winding said coils on tapered forms, as illustrated in said drawings.

Figure 8:
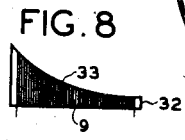
Figure 7:

Figs. 7 and 8 show two of these coils.

The same characters indicate the same parts throughout the several views of Figs. 1 to 4 and similarly of Figs. 5 and 6.

With regard to the drawings, wherein the preferred embodiment of my invention is disclosed, reference number 5 indicates a base or support of any suitable material to which is secured a hollow cylinder 6 preferably of bakelite. The cylinder has integral therewith a flange 7 and axial bearing member 8.

Mounted on the cylindrical member 6 is a resistance coil 9 wound upon a suitable dielectric after the manner described hereinafter. A shaft 11 in bearing 8 has rigidly fixed thereto in any suitable manner, such as by a set screw (not shown), a wiping contact arm 12 which cooperates with the resistance element 9 to adjust the value thereof, as is well understood in the art. The stops 13 are provided to limit the travel of the contact arm 12.

Figures 3, 4:
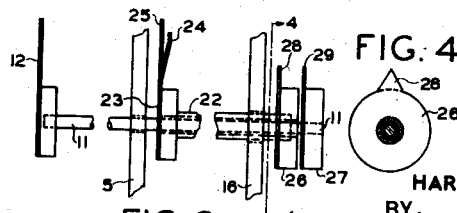
Fig. 3 is a side elevational view of the entire device with the means for operating the contact arms.
Fig. 4 is a view taken on line 4—4 of Fig. 3 showing an operating knob.

The base 5 has apertures 14 which are adapted to receive the reduced, threaded ends of the spacers 15, the opposite ends of which are rigidly fixed to another support or base 16. To secure to the base 5 the spacers 15, nuts (not shown) are employed. The relative positions of the bases 5 and 16 are illustrated in Figs. 2 and 3.

A cylinder 17, similar to cylinder 6, is suitably secured to base 16 and has integral therewith an axial bearing member 18. Two resistance coils 19 and 21 concentrically arranged and preferably insulated from each other by means of a thin strip of insulating material 20 are mounted on the cylinder 17.

A hollow shaft 22, through which shaft 11 extends, is journalled in bearing 18 and carries at one end a wiper 23 which is bifurcated to form two fingers 24 and 25 of unequal length, the former being bent out of the plane of the wiper 23 to cooperate with resistance coil 19. Finger 25 is adapted to slide along an edge of resistance coil 21. The edges of the two coils are not in the same transverse plane, but coil 21 projects beyond coil 19.

Operating handles 26 and 27 are attached to shafts 22 and 11, respectively. Pointers 28 and 29 indicate on a scale (not shown) the relative positions of the contact arms of wipers 12 and 23 with respect to the resistance coils. When said shafts are operated so that said pointers are both at one end of the scale, the contact arms will be in a position such that the attenuation loss introduced by the device will be a minimum. Similarly, when the operating handles are turned to the other extreme position, the attenuation loss introduced by the device will be a maximum. Further, setting of the operating handles to any point between its limits of rotation will introduce attenuation losses in the device of an amount between the minimum and maximum proportional to said degree of rotation, and the variation of attenuation loss will be continuous from one setting of the operating handles to another.

Coils 9, 19 and 21 are connected as shown at $y$, $x$ and $x'$ respectively in Fig. 5A. In Fig. 5B there are two coils such as 19 at $x$ and $x''$ and two such coils as 21 at $x'$ and $x'''$. Fig. 5C shows one coil like the coil 19 at $x$ and two coils such as coil 9 at $y$ and $y'$; while Fig. 5D is similar to Fig. 5C with the coil 21 ($x'$) in the opposite side of the circuit. In Fig. 5D the arrangement is as in Fig. 5A with coil 21 ($x'$) omitted.

Artificial lines used as attenuation networks are generally of one of the forms shown in Figs. 5A, 5B, 5C, 5D and 5E. Inasmuch as it is customarily desired to introduce real attenuation without change of phase, the impedance elements indicated as $x$, $x'$ and $y$ may consist of non-inductive resistances. Consider for example the case shown in Fig. 5A, commonly called a T-type artificial line. In order that the characteristic impedance of the network be some constant value, $Z_0$ ohms, and the attenuation loss inserted thereby be $N$ decibels, it is necessary that the resistance elements be determined from the formula:

$$x = x' = Z_0 \frac{(1-n)}{(1+n)}$$

$$y = Z_0 \frac{2n}{1-n^2}$$

where $$n = 10^{0.05N}$$

The resultant values of $x$, $x'$ and $y$ for various values of $N_{db}$ when plotted, result in curves of the same general form as indicated in Fig. 6.

The characteristic impedance of the combination including the three elements $x$, $x'$ and $y$, viewed from the input end, is constant; for the various positions of the operating knobs but the attenuation loss through the combination or network varies from a minimum to a maximum over the range of adjustment as indicated by the curve marked "Attenuation loss" in Figure 6.

In accordance with this invention, the advantage of an attenuation device providing smooth and gradual variations in the amount of attenuation loss inserted, as contrasted to existing types of artificial lines in which the inserted attenuation loss is adjusted in comparatively large and discrete steps, is realized by providing resistance elements of such a nature that the variation of the resistance inserted in the $x$, $x'$ and $y$ arms follows the curves $x$, $x'$ and $y$ in Fig. 6. This is accomplished physically by winding the resistance elements on tapered forms with sliding contacts. Coils 19 and 21 are each wound on a tapered form 31, having straight sides, as shown in Fig. 7. Coil 9 is wound on a tapered form 32, having one concave side 33, as shown in Fig. 8. Form 32 is then mounted on hollow cylinder 6 and clamped at its ends by means of strips 13 and suitable nuts and bolts. Coils 19 and 21 are mounted in like manner on cylinder 17. The projecting ends of the clamping strips form the stops for the arms 12 and 23.

The arms 12 and 23 turn together in the same direction. As the resistance of coils 9 decreases in smaller steps, that of coils 19 and 21 each increases by larger amounts.

While an arrangement has been set forth wherein the series and shunt elements are controlled by separate knobs attached to concentric shafts, it is to be understood that the invention is not limited to the specific apparatus shown, but is applicable to cases wherein the elements are varied simultaneously through the use of a common shaft.

It is of course obvious that the invention is not only adapted to insert attenuation loss between two transmission lines but is of equal utility as a means of adjusting the energy level at various points in transmission systems employing devices for producing, amplifying and translating electrical energy.

What is claimed is:

1. A variable attenuator comprising tapered forms and resistances wound on said tapered forms, said forms being mounted upon a cylinder in layers so that one of said forms projects beyond the other for contact purposes.

2. A variable attenuator comprising a tapered form having rectilinear sides, a resistance wound on said tapered form, a second tapered form having at least one curvilinear side, and a resistance wound on said last mentioned form, both of said forms being cylindrically mounted so that one projects beyond the other for contact purposes.

3. A variable attenuator comprising tapered forms having rectilinear sides, series resistances wound on said tapered forms, a tapered form having at least one curvilinear side, and a shunted resistance wound on said last mentioned form, both of said forms being cylindrically mounted so that one projects beyond the other for contact purposes.

4. A variable attenuator comprising tapered forms and resistances wound on said forms, said forms being mounted upon a cylinder in layers so that one of said forms projects beyond the other, a shaft extending through said cylinder provided with an arm for engaging the edges of said forms.

In witness whereof, I hereunto subscribe my name this 22nd day of October, 1930.

HAROLD R. HUNKINS.